United States Patent [19]

Hamanaka et al.

[11] Patent Number: 4,582,692

[45] Date of Patent: Apr. 15, 1986

[54] METHOD OF CONTROL FOR A WET LIME-GYPSUM PROCESS DESULFURIZATION PLANT

[75] Inventors: Kengo Hamanaka; Susumu Kono, both of Hiroshima; Katsuyuki Morinaga; Yutaka Nonogaki, both of Tokyo, all of Japan

[73] Assignee: Mitsubishi Jukogyo Kabushiki Kaisha, Tokyo, Japan

[21] Appl. No.: 604,362

[22] Filed: Apr. 26, 1984

[30] Foreign Application Priority Data

Apr. 26, 1983 [JP] Japan .................................. 58-73376
Apr. 26, 1983 [JP] Japan .................................. 58-73377

[51] Int. Cl.$^4$ .............................................. C01B 17/00
[52] U.S. Cl. ........................................ 423/242; 422/62
[58] Field of Search ........... 423/242 A, 242 R, 244 A, 423/244 R; 55/73; 422/62; 436/122

[56] References Cited

U.S. PATENT DOCUMENTS 3,409,409 11/1968 Sackett ................................. 422/62
4,208,383 6/1980 Kisters et al. ....................... 423/242
4,431,618 2/1984 Boward et al. ....................... 422/62

FOREIGN PATENT DOCUMENTS 54-24277 2/1979 Japan .................................. 423/242
55-20633 2/1980 Japan .................................. 423/242
56-105729 8/1981 Japan .................................. 423/242

*Primary Examiner*—Gregory A. Heller
*Attorney, Agent, or Firm*—Wenderoth, Lind & Ponack

[57] ABSTRACT

In an absorption tower of a wet lime-gypsum process desulfurization plant which desulfurizes an exhaust gas by bringing an incoming exhaust gas into contact with an absorbent liquid circulated therethrough by means of a plurality of pumps, an optimum pH value of the absorbent liquid and an optimum number of working pumps are set according to an amount of an exhaust gas load of the absorption tower, and a feed rate of the absorbent liquid and a number of working pumps are controlled on the basis of these set values. According to one mode of embodiment of the invention, a variation rate of the exhaust gas load and a desulfurization ratio are detected, and when the amount of exhaust gas load is constant or rising and also the desulfurization ratio is lower than a desired desulfurization ratio, the number of working pumps is correctively increased. According to another mode of embodiment of the invention, there are provided first and second simulation model, in the first simulation model a pH value of an absorbent liquid and a desulfurization ratio are calculated on the basis of an exhaust gas flow rate, an inlet $SO_2$ concentration, an absorbent liquid circulation flow rate and a feed rate of a neutralizing agent of the absorbent liquid, these calculated values are compared with detected values of the pH value and the desulfurization ratio during operation, a reaction constant set within the first and second simulation model is corrected on the basis of deviations between the compared values, and said two optinum set values are calculated by the corrected second simulation model.

1 Claim, 5 Drawing Figures

METHOD OF CONTROL FOR A WET LIME-GYPSUM PROCESS DESULFURIZATION PLANT

The present invention relates to a method of control for a wet lime-gypsum process desulfurization plant, which has an excellent following capability to a great and abrupt load variation for an $SO_2$ absorption apparatus in the plant.

In general, an $SO_2$ absorption apparatus is constructed as shown in FIG. 1, and desulfurization is effected in the following manner. When an exhaust gas 1 enters into an absorption tower 3 through a duct 2, it makes contact with a circulating absorbent liquid 4 in the absorption tower. Sulfur dioxide gas ($SO_2$) in the exhaust gas produces sulfurous acid ($H_2SO_3$) in the liquid as a result of absorbing reaction represented by the following formula (1):

$$SO_2 + H_2O \rightarrow H_2SO_3 \tag{1}$$

Thereafter, the exhaust gas passes through an exhaust line 5 and is discharged from a stack.

On the other hand, the liquid in which $H_2SO_3$ was produced flows down from the bottom portion of the tower into a tank 6. The tank 6 is supplied with a neutralizing agent (alkaline materials such as calcium carbonate, calcium hydroxide, etc.) through a feed line 7, and the neutralizing agent neutralizes the liquid and produces $CaSO_3$ therein. The neutralized liquid is fed into the absorption tower 3 through a circulation line 9 with the aid of a pump 8. In addition, a part of the circulating liquid is discharged through a discharge line 19, and in a subsequent step of the process, $CaSO_3$ in the liquid is oxidized into $CaSO_4 \cdot 2H_2O$ (gypsum).

A method of control in the prior art for this $SO_2$ absorption apparatus was effected in the following manner. That is, the pH value of the circulating absorbent liquid is detected by a pH detector 11, and a detection signal is input to a regulator 12. The regulator 12 transmits a signal to an adder 13 such that the pH value of the absorbent liquid coming to the top of the tower may become constant.

On the other hand, the amount of $SO_2$ entering into the plant (for instance, a product of an exhaust gas flow rate by an inlet $SO_2$ concentration), that is, the load of the desulfurization plant (hereinafter called "desulfurization load") is detected by a load detector 14, and a detection signal is input to the adder 13. In the adder 13, the signal sent from the regulator 12 and the signal sent from the load detector 14 are added together, and the resultant signal is input to a flow rate regulator 17 as a set value signal. Also, the flow rate in the feed line 7 is detected by a flow rate detector 16 and a detection signal is input to the flow rate regulator 17. This flow rate regulator 17 controls a regulation valve 18 on the basis of these input signals.

In other words, in the heretofore known method of control, it is intended to feed a neutralizing agent that is equivalent in amount to the $SO_2$ to be absorbed by making the output from the regulator 12 have a feedback effect and making the output from the load detector 14 have a feedforward effect, and the known method is based on the technical concept that if a neutralizing agent that is equivalent in amount to the $SO_2$ entering into the plant is fed, then $SO_2$ can be absorbed always at the same desulfurization ratio. This technical concept is valid in the case where, upon rise of a desulfurization load, the neutralizing reaction speed in the plant is faster than or at least equal to the rising speed.

However, the desulfurization capability would vary depending upon the $H_2SO_3$ concentration in the absorbent liquid and the pH value of the liquid, and the lower the $H_2SO_3$ concentration is and the higher the pH value is, the higher is an absorbing capability for $SO_2$.

The reaction speed $\gamma$ of the absorbing reaction of the formula (1) above is represented by the following equation (2):

$$\gamma = K \cdot A \cdot (CG - CL) \tag{2}$$

where
$\gamma$: absorbing reaction speed,
A: contact area between a gas and a liquid,
CG: $SO_2$ concentration in a gas,
CL: $H_2SO_3$ concentration in a liquid, and
K: coefficient of mobility of general $SO_2$ absorbent materials.

Now a method of control for maintaining a pH value constant by feeding a neutralizing agent will be explained on the basis of the equation (2) above. Firstly, if the absorbent liquid absorbs $SO_2$ in the gas, then the $H_2SO_3$ concentration CL in the liquid becomes high and hence the absorbing reaction speed $\gamma$ is lowered. Therefore, it is necessary to maintain the $H_2SO_3$ concentration CL in the liquid low by neutralizing $H_2SO_3$. Secondly, since the coefficient of mobility K is a function of the pH value, it is necessary to neutralize the absorbent liquid so that the $H_2SO_3$ concentration may not become high resulting in lowering of the pH value.

However, due to the fact that the neutralizing reaction speed is very low, when a rising speed of a load is high, even if a neutralizing agent that is equivalent in amount to the load is fed, it is impossible to maintain the pH value at a desired value. Since the desulfurization capability is lowered when the pH value is lowered, it is necessary to make the neutralizing reaction speed large.

It is to be noted that the desulfurization capability is generally represented by a desulfurization ratio $\eta$ as defined by the following equation (3):

$$\eta = \frac{CG_1 - CG_0}{CG_1} \tag{3}$$

where
$CG_1$: $SO_2$ concentration in a plant inlet gas, and
$CG_0$: $SO_2$ concentration in a plant outlet gas.

On the other hand, the pH value is lowered if the $H_2SO_3$ concentration is raised, while it rises if a lot of unreacted $CaCO_3$ is present, that is, if the $CaCO_3$ concentration in the liquid is high.

From the above-mentioned fact, in order to make it possible to follow an abrupt rise of a load, the following methods can be conceived:

(1) A method in which the plant is operated always, that is, under any load condition, at a high pH value to maintain the condition where a lot of unreacted $CaCO_3$ is reserved in the plant and thereby a margin is retained for a rise of the load, or (2) a method in which the plant is operated at a high pH value during a low load operation.

However, these methods are quite uneconomical. More particularly, when the $CaCO_3$ concentration in the tank 6 is high, the adsorbent liquid is being discharged externally through the discharge line 19 at that high concentration. Consequently, if a lot of unreacted CaCO₃ is reserved when a low reaction speed γ suffices under a low load condition, the raw material (neutralizing agent) must be fed much. Furthermore, if the CaCO₃ component is not fully used for the neutralizing reaction within the absorbing tower 3 but is discharged externally through the discharge line 19, then the discharged liquid must be neutralized by sulfuric acid in the subsequent step of the process.

As described above, according to the aforementioned methods, not only is the amount of unused CaCO₃ increased, but also the amount of sulfuric acid for carrying out neutralizing treatment for the unused CaCO₃ is increased. In addition, according to these methods, since there exists a margin in the process under a low load condition, the desulfurization capability becomes unnecessarily high.

From the above-mentioned reasons, it can be said that in order to operate the plant with a reduced amount of consumption of a neutralizing agent and sulfuric acid, it is only necessary to operate the plant at a low pH value under a low load condition and at a high pH value under a high load condition.

As a method of control for achieving the above-mentioned mode of operation, there is a method in which the set value of the pH value of the pH regulator 12 is made dependent upon the load. In this case, the pH value is preliminarily calculated so that a desired desulfurization ratio may be attained under any load condition. The relation of dependency of a pH set value upon a load for attaining a desired sulfurization ratio is different for the respective plants, but generally the relation is a function as depicted in FIG. 2.

Although this method of control is very favorable for minimizing the amount of consumption of a neutralizing agent and sulfuric acid, the method is not practical in the aspect of a following capability to a high speed load variation.

More particularly, in order to vary the pH value over a wide range as shown in FIG. 2, it is necessary to vary the CaCO₃ concentration within the plant so as to correspond to the variation of the pH value. In order to realize a variation width of the pH value of 1.0 (for instance, a variation width of from 4.7 to 5.7), the CaCO₃ concentration must be varied by a factor of about 10. When a load has varied from 25% to 100% at a speed of 5%/min. in average, the time elapsed during this period is 15 minutes.

On the other hand, the amount of CaCO₃ within the tank 6 ([volume of liquid within a tank]×[CaCO₃ concentration]) is an amount fed in about 10 hours at the CaCO₃ feed rate under a 100% load condition. In other words, the amount of CaCO₃ staying in the tank 6 corresponds to 10 hour feed in terms of the feed rate thereof.

Accordingly, for the purpose of increasing such a large amount of CaCO₃ by a factor of 10, for example, during 15 minutes, an enormous amount of CaCO₃ must be fed. Therefore, this method cannot be said to be a practical method in the aspect of the feeding equipment, and it is difficult to follow a variation of a load.

In view of the above-mentioned fact, the inventors of this invention have contemplated to reduce the variation width of the pH value by adding another operation.

Returning now to the equation (2) above, in the case where a load has varied, it is only necessary to change the gas/liquid contact area A in accordance with the load variation. This gas/liquid contact area A is one factor governing an absorbing reaction speed in a packed layer, and it is influenced by the rate of the flowing liquid as indicated by the following equation:

$$A = (L/S)^\alpha$$

where

L: flow rate (m³/Hr) of a liquid flowing down through an absorbing tower, that is, a circulating liquid flowing through the line 9, S: cross-section area, and α: parameter to be determined experimentally, which is a number equal to or smaller than 0.3–1. Accordingly, if the gas/liquid content area A is varied in accordance with a load, then there is no need to change the pH value in the above-described manner and hence it becomes easy to follow a load variation.

However, in the case of a desulfurization apparatus, in order to make the gas/liquid contact area A continuously correspond to a load, there remain the following problems.

Firstly, the circulating liquid is a slurry. Therefore, in the event that solid components contained in the liquid per se and solid components produced by the reaction within the tower adhere onto the wall and the compacted material, it is necessary to wash out these components by means of the circulating liquid itself. Accordingly, it has been found that the circulating liquid flow rate L cannot be made extremely small and the minimum limit is about ⅓ of the amount upon 100% loading. This means that since the parameter α is smaller than 1, in the case of, for instance, α=0.7 even if the circulating liquid flow rate L is reduced by a factor of ⅓, the gas/liquid contact area A cannot be reduced to 45% or less.

Secondly, since the circulating liquid is slurry which results in remarkable abrasion, it is impossible to regulate a circulating flow rate by means of a valve.

From the above-mentioned reasons, in order to vary the gas/liquid contact area A, it is advantageous to vary the circulating liquid flow rate L by changing the number of working circulating liquid pumps.

If a large number of pumps are provided and these pumps are selectively turned ON or OFF, then the gas/liquid contact area A can be continuously adapted for a load variation over a considerably wide range. However, the cost necessitated for the pumps and their relevant equipment is not proportional to the capacity of the pump but includes a part of the fixed cost for each pump, and hence it is not economical to excessively increase the number of pumps. Whereas, if the number of pumps is too small, the variation of the circulating liquid flow rate L becomes very discrete.

It is therefore one object of the present invention to provide a method of control for a wet lime-gypsum process desulfurization plant, which is free from the above-mentioned shortcomings of the control method in the prior art, and which has been improved in economy and following capability to variation of a load.

According to one feature of the present invention, there is provided a novel method of control for a wet lime-gypsum process desulfurization plant, in which in an absorption tower of the plant which desulfurizes an exhaust gas by bringing an incoming exhaust gas into contact with an absorbent liquid circulated therethrough by means of a plurality of pumps, an optimum pH value of the absorbent liquid and an optimum number of working pumps are set according to an amount of an exhaust gas load of the absorption tower, and a feed rate of the absorbent liquid and a number of working pumps are controlled on the basis of these set values, whereby economy and following capability to variation of a load of the plant can be improved.

According to another feature of the present invention, there is provided a method of control for a wet lime-gypsum process desulfurization plant, in which in an absorption tower of the plant which desulfurizes an exhaust gas by bringing an incoming exhaust gas into contact with an absorbent liquid circulated therethrough by means of a plurality of pumps, an optimum pH value of the absorbent liquid and an optimum number of working pumps are set according to an amount of an exhaust gas load of the absorption tower, and a feed rate of the absorbent liquid and a number of working pumps are controlled on the basis of these set values, and in which a variation rate of the exhaust gas load and a desulfurization ratio are detected, and when the amount of the exhaust gas load is constant or rising and also the desulfurization ratio is lower than a desired desulfurization ratio, the number of working pumps is correctively increased, whereby economy and following capability to variation of a load of the plant can be improved.

According to yet another feature of the present invention, there is provided a method of control for a wet lime-gypsum process desulfurization plant, in which in an absorption tower of the plant which desulfurizes an exhaust gas by bringing an incoming exhaust gas into contact with an absorbent liquid circulated therethrough by means of a plurality of pumps, an optimum pH value of the absorbent liquid and an optimum number of working pumps are set according to an amount of an exhaust gas load of the absorption tower by means of a simulation model, and a feed rate of the absorbent liquid and a number of working pumps are controlled on the basis of these set values, and in which there are provided first and second simulation models, in the first simulation model a pH value of the absorbent liquid and a desulfurization ratio are calculated on the basis of an exhaust gas flow rate, an inlet $SO_2$ concentration, an absorbent liquid circulation flow rate and a feed rate of a neutralizing agent of the absorbent liquid, these calculated values are compared with detected values of the pH value and the desulfurization ratio during operation, a reaction constant set within the first and second simulation models is corrected on the basis of deviations between the compared values, and said two optimum set values are calculated by the corrected second simulation model, whereby economy and following capability to variation of a load of the plant can be improved.

The above-mentioned and other features and objects of the present invention will become more apparent by reference to the following detailed description of preferred embodiments of the invention taken in conjunction with the according drawings, wherein.

Now two preferred embodiments of the present invention will be described in detail with reference to FIGS. 3 to 5.

Figure 3:
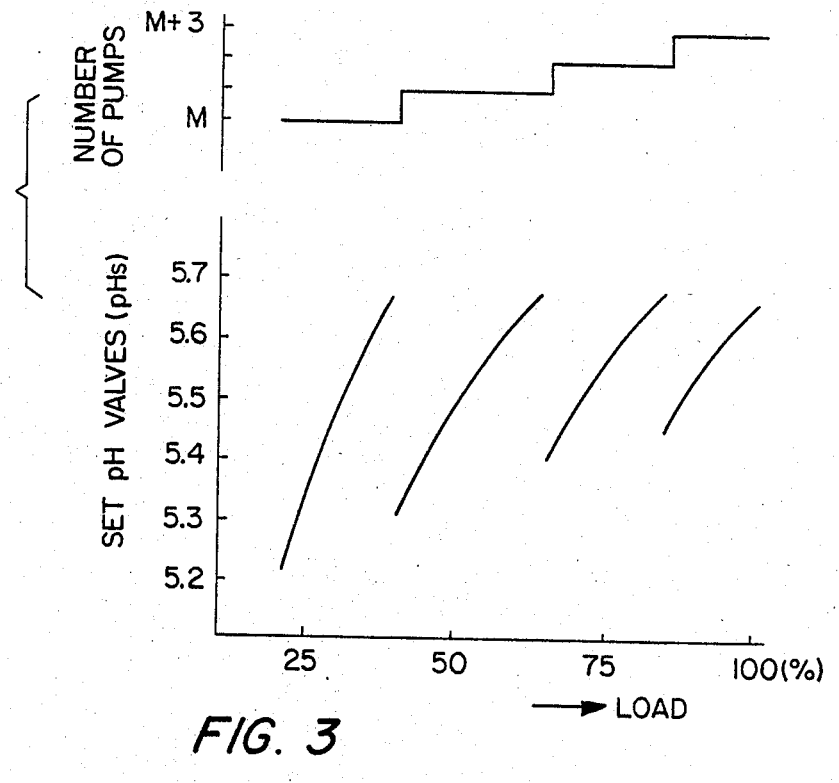
FIG. 3 is a characteristic diagram showing one example of the relations between an amount of an exhaust gas load and an optimum number of working pumps and optimum pH value, respectively, in the method of control for a wet lime-gypsum process desulfurization plant according to the present invention.
Figure 4:
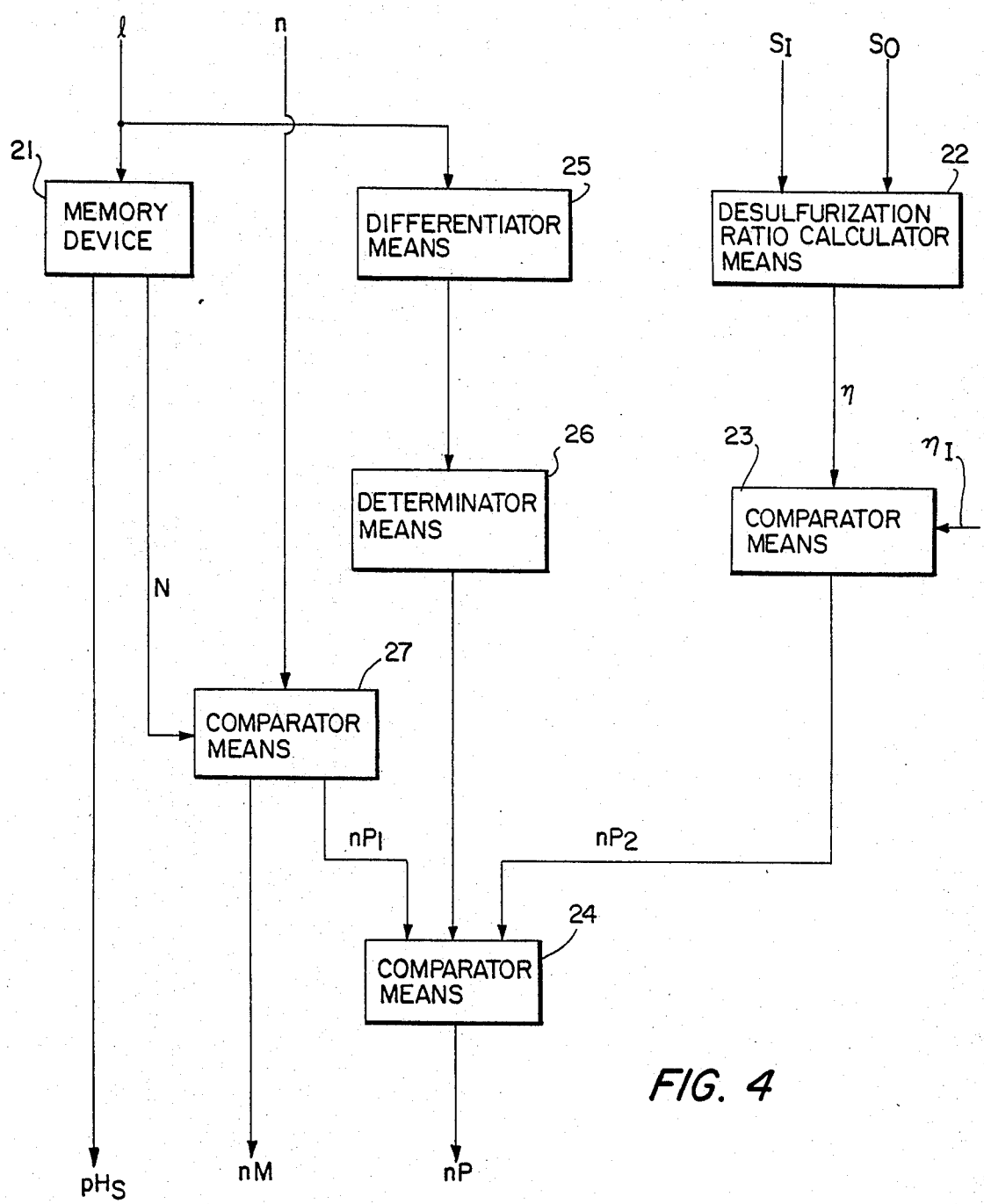
FIG. 4 is a block diagram showing a control logic in one preferred embodiment of the method of control according to the present invention.

In a first preferred embodiment of the present invention, functions as shown in FIG. 3 are stored in a memory device 21 in a computer shown in FIG. 4, a load amount l is input to the memory device 21, an optimum number N of working pumps as well as an optimum operating pH value (pHs) are set according to variation of the load amount l, and the respective set values are output in the form of an ON/OFF signal for each pump 8 and a pH set value signal for the pH regulator 12 to achieve control of the plant. Here, the term "optimum" is used to mean the lowest pH value and the minimum number of pumps for realizing a desired desulfurization ratio. In this connection, reference character M in FIG. 3 represents a minimum necessary number of the pumps. It is to be noted that FIG. 3 shows merely one example of the characteristics, and practical relations between the load amount and the optimum number of working pumps and optimum operation pH value are different for the respective plants, depending upon an exhaust gas flow rate, an inlet $SO_2$ concentration, various impurities contained in an exhaust gas or in a feed water, and the like. In addition, while the diagram as shown in FIG. 3 is preliminarily set up upon designing a plant, it is adjusted by means of test operation data because a delicate error would appear after the operation has been commenced. It is to be noted that assuming that a guaranteed desulfurization ratio $\eta_G$ is, for example, 90%, FIG. 3 shows a pH set value (pHs) and a number N of pumps which are necessitated for obtaining a desulfurization ratio of 92% that is a few % higher than the guaranteed desulfurization ratio $\eta_G$.

According to this method, since the circulation flow rate of the absorbent liquid 4 is controlled by varying a number of working ones of the pumps 8, the range of the pH value to be varied becomes narrow, and hence following to load variation becomes easy. Moreover, since control of the pH set value is effected, a necessary number of the pumps 8 could be small.

Here, it is essentially important that FIG. 3 shows optimum characteristics under a static condition where load variation is not present or is gradual. Therefore, under a transient condition where abrupt load variation occurs, it may possibly occur that the desulfurization ratio becomes lower than a desired desulfurization ratio.

Therefore, according to the first preferred embodiment of the present invention, a desulfurization ratio under a transient condition can be guaranteed by means of a control logic as illustrated in FIG. 4.

In this control logic, an $SO_2$ concentration $S_1$ in an inlet exhaust gas and an $SO_2$ concentration $S_0$ in an outlet exhaust gas are input to desulfurization ratio calculator means 22 to calculate a desulfurization ratio $\eta$. The desulfurization ratio $\eta$ obtained by this calculator means 22 is applied to comparator means 23, in which the desulfurization ratio $\eta$ is compared with a present desulfurization ratio $\eta_I$. Here, the preset desulfurization ratio $\eta_I$ is a lower limit value of a detected desulfurization ratio $\eta$, at which it is judged that the detected desulfurization ratio $\eta$ is about to become lower than the guaranteed desulfurization ratio $\eta_G$ and hence the number of working pumps is increased. For instance, if the guaranteed desulfurization ratio $\eta_G$ is 90%, the preset desulfurization ratio $\eta_I$ is set at 91%. If the comparator means 23 finds the relation of $\eta < \eta_I$, then it transmits a demand signal for increasing the number of pumps, that is, a signal $nP_2$ for instructing to add one to the number of pumps, to separate comparator means 24.

On the other hand, a load signal l is input to differentiator means 25 to calculate a variation speed of the load. This calculated value is input to determinator means 26 consisting of a filter and a comparator. In the determinator means 26, it is determined whether or not the load variation has a very long repetition period and whether the load is rising (or stationary) or the load is falling, and the results are applied to the comparator means 24. And, the comparator means 24 operates in such manner that in the case where the load variation has a very long repetition period and the load is rising (or stationary), the above-described pump number increase signal $nP_2$ may be made effective. It is to be noted that in the event that the load is varying at a relatively high frequency (for instance, with a repetition period of 5 minutes or less), since the load variation can be followed by the capacity of the plant (that is, by the unreacted neutralizing agent staying in the tank), there is no need to make the pumps follow the high frequency load variation.

Furthermore, a number n of currently working pumps and the optimum number N of working pumps derived in the memory device 21 are compared with each other in additional comparator means 27, and as a result of the comparison, either a pump number increase signal $nP_1$ is applied to the above-mentioned comparator means 24 or a pump number decrease signal nM is output depending upon the load condition. The comparator means 24 is an element including an AND logic, and it operates to output a signal nP for instructing increase of the number of pumps when the load is rising or stationary and also either the pump number increase signal $nP_1$ or the pump number increase signal $nP_2$ is present.

Accordingly, in the above-described first preferred embodiment of the present invention, even if the desulfurization load should change abruptly, always the desulfurization ratio can be maintained at a predetermined value, and moreover, the amount of use of a neutralizing agent and sulfuric acid can be reduced to realize resource saving as well as energy saving. In addition, in the above method, the driving electric power for the pumps is nearly proportional to the desulfurization load, and hence remarkable advantages can be realized as compared to the control method in the prior art.

Next, a second preferred embodiment in which the control method according to the present invention is practiced by making use of simulation models, will be explained with reference to FIG. 5.

In the second preferred embodiment of the present invention also, functions as shown in FIG. 3 are stored in a memory device in a computer, a load amount is input to the computer, an optimum number of working pumps as well as an optimum operating pH value are set according to variation of the load amount, and the respective set values are output in the form of an ON/-OFF signal for each pump 8 and a pH set value signal for the pH regulator 12 to achieve control of the plant. Here, the term "optimum" is used to mean the lowest pH value and the minimum number of pumps for realizing a desired sulfurization ratio. In this connection, reference character M in FIG. 3 represents a minimum necessary number of the pumps. It is to be noted that FIG. 3 shows merely one example of the characteristics, and practical relations between the load amount and the optinum number of working pumps and optimum operation pH value are different for the respective plants, depending upon an exhaust gas flow rate, an inlet $SO_2$ concentration, various impurities contained in an exhaust gas and in a feed water, and the like.

According to this method, since the circulation flow rate of the absorbent liquid 4 is controlled by varying a number of working pumps 8, the range of the pH value to be varied becomes narrow, and hence following to load variation becomes easy. Moreover, since control of the pH set value is effected, a necessary number of the pumps 8 could be small.

While the characteristics shown in FIG. 3 is preliminarily set up as by simulation or the like, there is no guarantee that a plant can be operated according to the foreseen characteristics, but the characteristics will vary day by day from the reasons as will be described below. More particularly, an extremely small amount of halogen and metals such as Mn or the like contained in an exhaust gas (that is, contained in a fuel of a boiler) as well as similar impurities contained in a raw material neutralizing agent, achieve a catalytic action for various reactions. In addition, a neutralizing agent $CaCO_3$ is fed into an absorption tower after solid (pulverized) $CaCO_3$ has been mixed with water in a preceding step of the process, and the grain diameter and a hardness (hence, the easiness of dissolution after charging into the absorption tower) are different for the respective lots of the raw materials.

Accordingly, due to these factors, the characteristics of the process would vary delicately day by day. Although the variation width of these characteristics is not large, since one of the objects of the present invention is to achieve energy saving and resource saving, the desulfurization plant must be controlled at a high precision so as to realize a desired operating condition.

Figure 1:
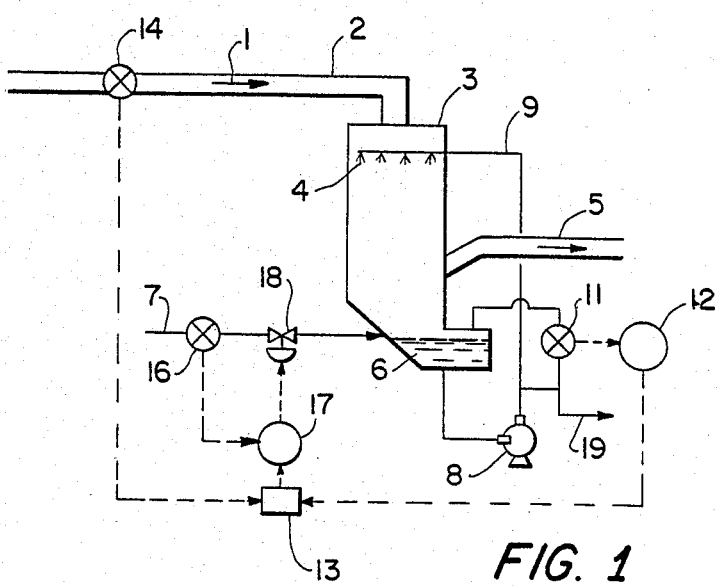
FIG. 1 is a schematic view showing a control method for a wet lime-gypsum process desulfurization plant in the prior art.
Figure 5:
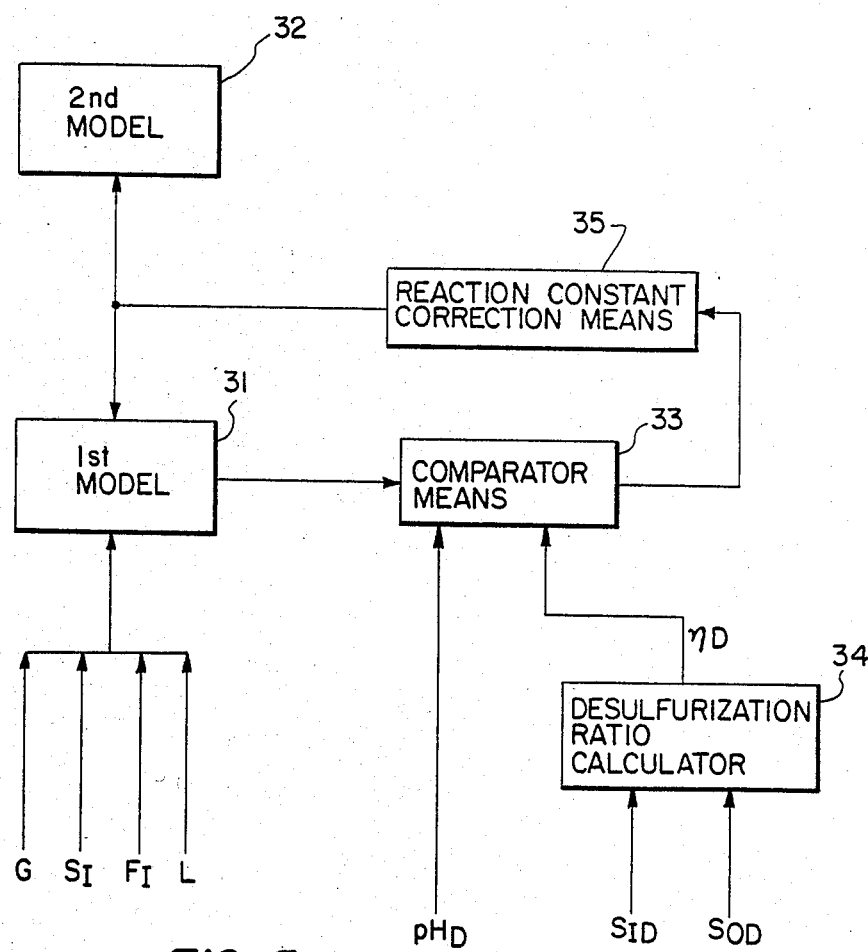
FIG. 5 is a block diagram showing a control logic in another preferred embodiment of the method of control according to the present invention, in which the characteritics shown in FIG. 3 are corrected with the aid of simulation models.
Figure 2:
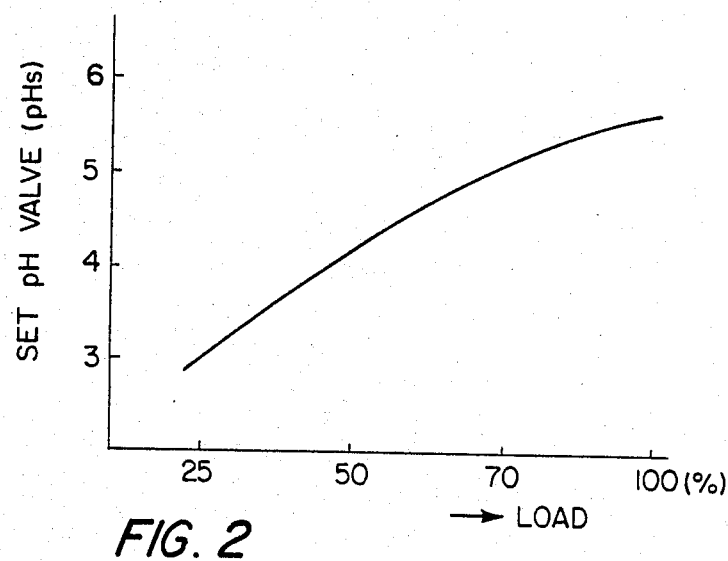
FIG. 2 is a characteristic diagram showing the relation between the amount of an exhaust gas load and the set pH value.

In the second preferred embodiment of the present invention, correction is carried out through the method shown in FIG. 5 by making use of first and second simulation models. A first simulation model 31 is an on-line seal-time simulation model, and a second simulation model 32 is a simulation model used when the characteristics shown in FIG. 3 were set up. At first, to the input of the first simulation model 31 are applied detection signals for an exhaust gas flow rate G, an inlet $SO_2$ concentration $S_1$, an absorbent liquid circulation flow rate L and a feed rate $F_1$ of the neutralizing agent of the absorbent liquid. Then, the first simulation model 31 calculates a pH value of the absorbent liquid within the tank 6 (more particularly, a pH value of the circulating absorbent liquid at the top of the absorption tower) and a desulfurization ratio on the basis of these input signals, and inputs the calculated values to comparator means 33.

On the other hand, an $SO_2$ concentration $S_{ID}$ at an exhaust gas inlet and an $SO_2$ concentration $S_{OD}$ at an exhaust gas outlet are detected, and these detection signals are input to a desulfurization ratio calculator 34. This calculator 34 calculates a desulfurization ratio $\eta_0$ and applies it to comparator means 33. A detected value $pH_D$ for a pH value of an absorbent liquid is also applied to the comparator means 33.

In this comparator means 33, a pH value and a desulfurization ratio calculated by the first simulation model 31 are compared with the actually measured pH detection value $pH_D$ and desulfurization ratio $\eta_D$, and deviations therebetween are applied to reaction constant correction means 35. This correction means 35 serves to correct reaction constants contained in the simulation models on the basis of the deviations, and a correction signal is fed back to the first simulation model 31. This correction is continuously effected so that the deviations may be eliminated. The items to be corrected mainly consist of a neutralizing reaction speed constant and an oxidizing reaction speed constant which have strong influences upon the process. Here, the oxidizing reaction means the reaction in which sulfurous acid ions produced by absorption are oxidized into sulfuric acid ions. This reaction reduces the $H_2SO_3$ concentration CL in the liquid appearing in the equation (2) and thereby greatly influences the desulfurization capability.

On the other hand, the correction signal output from the reaction constant correction means 35 is also input to the second simulation model 32, and hence the reaction constants in this second simulation model 32 can be automatically corrected.

Accordingly, in the case of this second preferred embodiment also, in the case of any desulfurization load amount, always the desulfurization ratio can be maintained at a predetermined value by employing an optimum pH value and an optimum number of working pumps, and also, the amount of use of a neutralizing agent and sulfuric acid can be reduced, resulting in resource saving and energy saving. Moreover, according to this method, the driving electric power for the pumps is nearly proportional to the desulfurization load, and hence remarkable advantages can be realized as compared to the control method in the prior art.

While a principle of the present invention has been described above in connection to two preferred embodiments thereof, it is a matter of course that all matters described in the specification and illustrated in the accompanying drawings shall be interpreted to be illustrative and not in a limiting sense.

What is claimed is:

1. In a method for controlling a wet lime-gypsum process desulfurization plant, wherein an absorption tower is provided which desulfurizes an exhaust gas by bringing an incoming exhaust gas into contact with an absorbant liquid circulated therethrough by means of a plurality of pumps, the improvement wherein a pH value of the absorbent liquid and a number of working pumps value are set according to the amount of the exhaust gas load of said absorption tower referring to set values which determines the lowest pH value of the absorbent liquid and the minimum number of working pumps for a given amount of desulfurization for each gas load, wherein said set values are prepared by performing a process simulation, and the feed rate of the absorbent liquid and the number of working pumps are controlled on the basis of said set values, and in which said process simulation is created by providing first and second simulation models, in the first simulation model the pH value of the absorbent liquid and the desulfurization ratio are calculated on the basis of the exhaust gas flow rate, the inlet $SO_2$ concentration, the absorbent liquid circulations flow rate and the feed rate of a neutralizing agent of the absorbent liquid, these calculated values are compared with the detected values of the pH value and the desulfurization ratio during operation, a reaction constant set within the first and second simulation models is corrected on the basis of deviations between the compared values, and said set values are thus created by the corrected second simulation model, whereby economy and capability to accept variation of the load of said plant are improved.

* * * * *